(12) United States Patent
Collier

(10) Patent No.: US 6,238,166 B1
(45) Date of Patent: May 29, 2001

(54) UTILITY TRAILERS

(76) Inventor: Douglas Collier, 1270 Columbia, No. 17, Stamps, AR (US) 71860

( * ) Notice: Subject to any disclaimer, the term of this patent is extended or adjusted under 35 U.S.C. 154(b) by 0 days.

(21) Appl. No.: 09/363,811

(22) Filed: Jul. 30, 1999

(51) Int. Cl.[7] .................................................. B60P 1/04
(52) U.S. Cl. ........................ 414/436; 414/469; 414/483; 298/17 R; 298/18
(58) Field of Search .................... 298/17 R, 20 R, 298/17 SG, 18; 414/469, 483, 436

(56) References Cited

U.S. PATENT DOCUMENTS

| 1,894,320 | * | 1/1933 | Muchenberger | 298/20 R |
| 3,189,387 | * | 6/1965 | Nieto | 298/20 R |
| 3,738,707 | * | 6/1973 | Bieber | 298/18 |
| 4,394,105 | * | 7/1983 | Mitchell | 414/436 |
| 4,711,499 | * | 12/1987 | Fortin | 298/5 |
| 4,958,978 | * | 9/1990 | Shedleski | 414/469 |

FOREIGN PATENT DOCUMENTS

| 587233 | * | 4/1947 | (GB) | 298/20 R |

* cited by examiner

Primary Examiner—Joseph A. Fischetti
(74) Attorney, Agent, or Firm—Dennis B. Haase

(57) ABSTRACT

A utility trailer having a bed mounted on an axle which is supported by at least two wheels and adapted to be towed by a vehicle over a surface, the trailer having a bed which is capable of being selectively dumped to expel the contents thereof, wherein an anchor is disposed on chains and selectively deployable to position the chains relative to the wheels such that when the anchor is deployed, the wheels of the trailer engage the chains to halt movement of the trailer and cause rotation of the trailers bed about its axis.

19 Claims, 2 Drawing Sheets

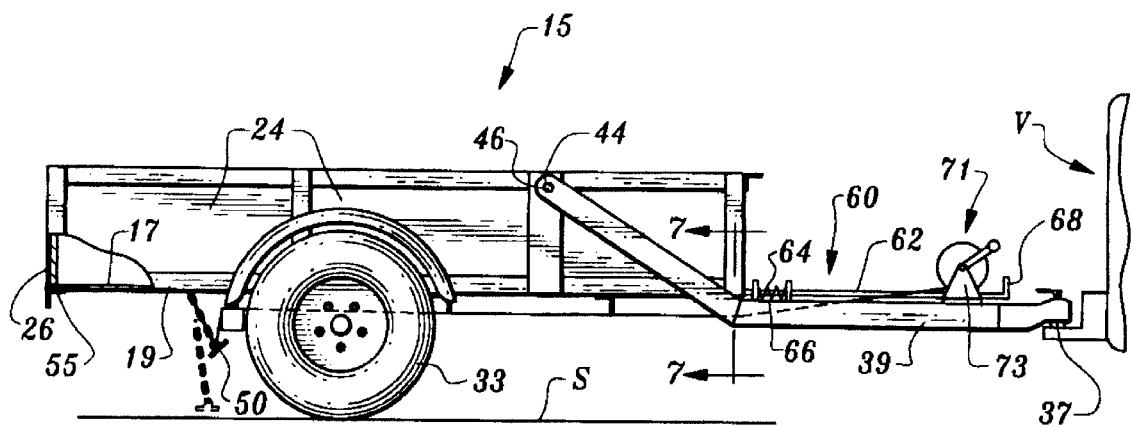
Fig. 1
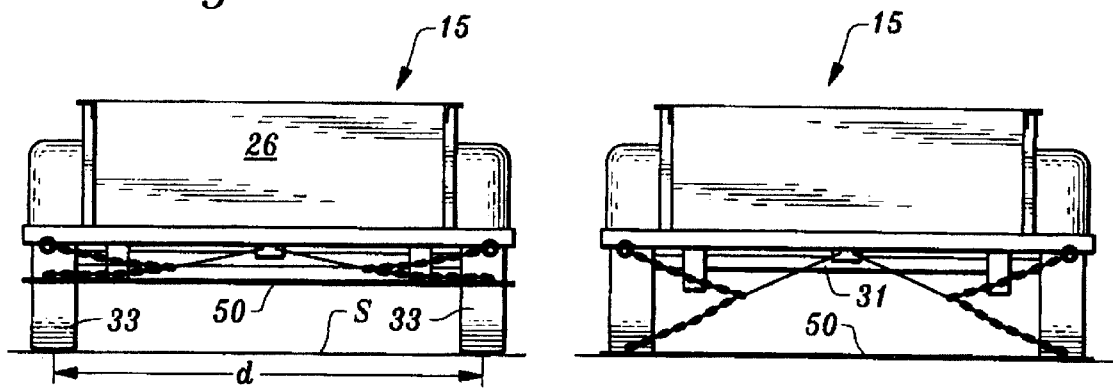
Fig. 2
Fig. 3
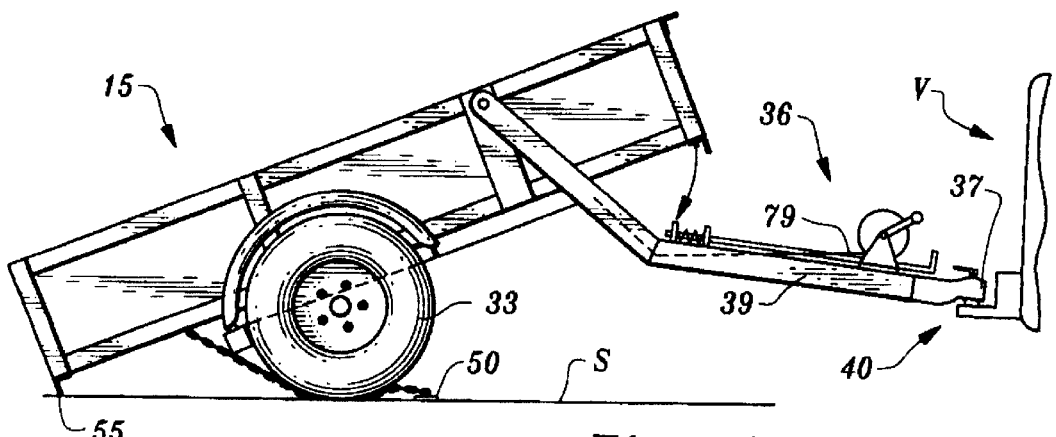
Fig. 4

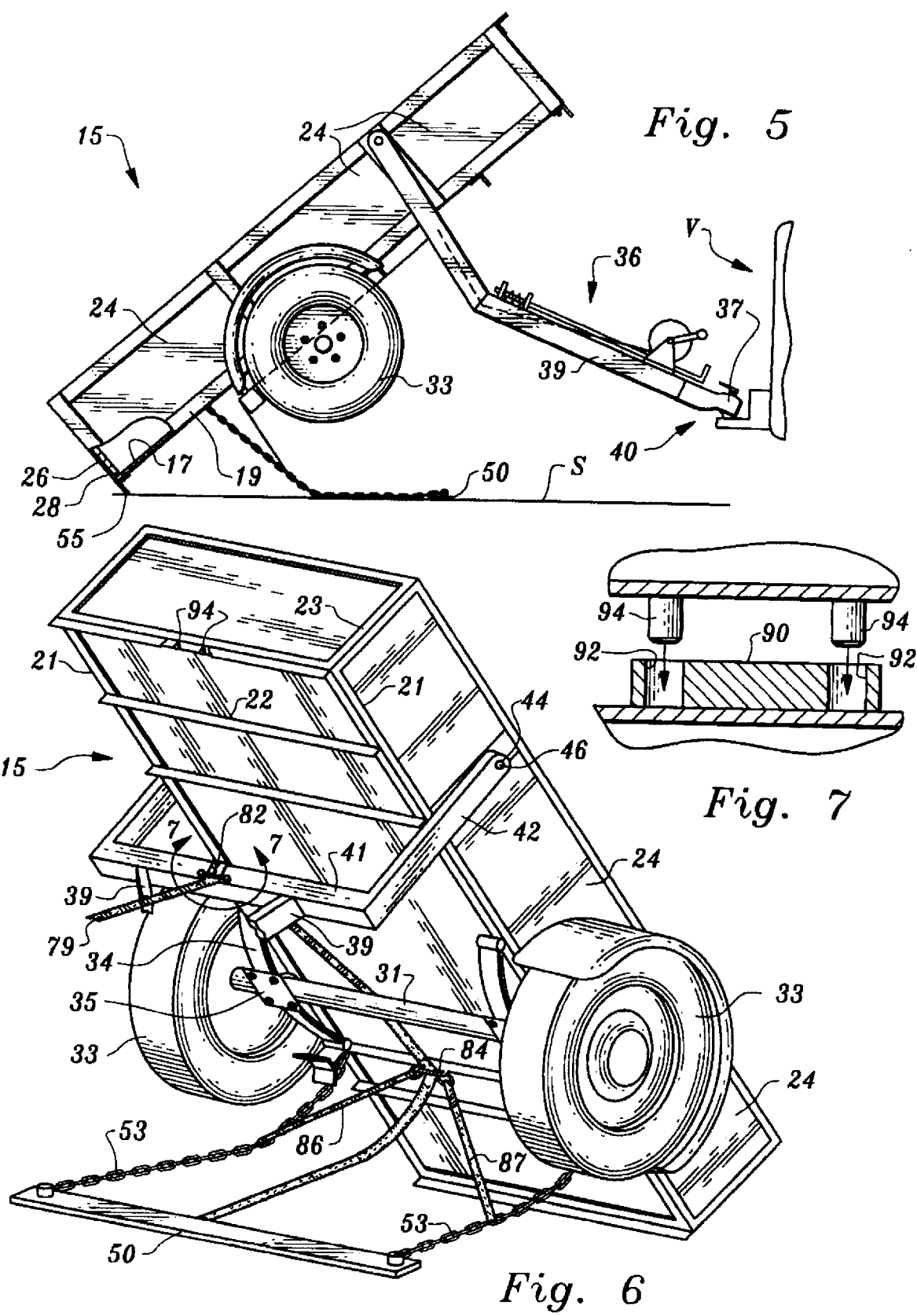

UTILITY TRAILERS

The present invention relates generally to smaller utility type trailers popularly used to tow riding mowers, ATVs, fire wood, and a plethora of other materials, and, more particularly, utility trailers that have the capability of dumping the contents thereof, or otherwise being tipped so as to permit the dismounting of the contents thereof with particular ease.

BACKGROUND OF THE INVENTION

1. Field of the Invention

With the explosion in technological innovation, there has been a coincident rise in the mechanization of society. By way of example, beginning with the simple reel type push mower, we now have riding mowers of all shapes and sizes, and sportsmen who once stalked the woods on foot, now ride in relative comfort on powerful all terrain vehicles.

ATVs are not only for fun. Rather, they work on farms and ranches, where they are favored because of their size and agility, over the more ponderous trucks which were traditionally the vehicle of primary reliance.

While the value of utility type trailers is obvious in a farm or ranch environment and for sport, such trailers have a variety of important uses in the lives of city dwellers and even those who live in apartments. Such trailers not only permit the hauling of ATVs and mowers, but fire wood, furniture, appliances, and landscaping materials, all material things encountered by people everywhere, are readily moved from the vendor who once, but no longer, delivers to their place of use, in utility trailers.

Since utility trailers of the type referenced here inherently have beds which repose on a set of wheels, they are necessarily off the ground, typically by at least the height of the axle. A tongue, or tow hitch, connects the frame of the trailer to a tow bar mounted on the towing vehicle, which may be a truck, sports utility vehicle, the family car, or even another ATV.

If the objects being towed are heavy, it is not always practical to lift them out of the trailer bed and, unless they are mobile, putting a ramp against the open end of the trailer bed will not always permit the safest way to unload the trailer. If the trailer is to be tipped about the axle to unload it, most such trailers must be disconnected from the tow hitch and, depending on the weight in the trailer, may be difficult, and even unsafe, to tip manually.

It is within this environment that the present invention has particular, although not exclusive, utility.

2. Overview of the Prior Art

The present invention is not the first utility trailer which is capable of being tipped to load and unload without disengaging it from the tow vehicle, but as a further reading of the Detailed Description will make evident, it is clearly the best.

As early as 1893, Butts and O'Marra perceived the value of a tiltable cart and patented their conception as U.S. Pat. No. 495,722. Their cart was used to dump material, e.g., ash from the cart off the end of a pier into a scow sitting below. The container was hinged to the frame of the cart and rotated about a hinge pin h when the horse backed the cart against a stop k, which is referred to as a string piece, to stop the wheels from further rotation.

In the 1962 patent to Schueller, U.S. Pat. No. 3,061,124, a boat trailer was equipped with a brake system which stopped the trailer wheels, and tilted the trailer bed when the tow vehicle proceeded to back up with the trailer wheels locked.

Several inventions have focused on limiting rearward movement of a vehicle, among them Hoffman U.S. Pat. No. 4,487,396 which involves chocks secured to the vehicle by a chain; Corti et al. U.S. Pat. No. 3,517,776, involving a complex mechanical mechanism for deploying chocks behind a truck, and a very early patent to Stuart, U.S. Pat. No. 828,633, which deployed a roller 15 as a brake behind a wagon.

Other inventors concentrated on mechanisms for selectively releasing the trailer bed from its transport position to permit rotation or tilting about the axle, among them, Gagnon U.S. Pat. No. 3,620,397; Carberry U.S. Pat. No. 4,494,797; Adams U.S. Pat. No. 4,872,728 and Kannady et al. U.S. Pat. No. 3,985,253.

Finally, Fortin, in his U.S. Pat. No. 4,711,499, combined many of the features of the prior art into his tipper trailer, except that rather than provide for stopping the wheels of the trailer as a means of creating a fulcrum for tilting the trailer bed, Fortin elects to use a sliding hinge which, hopefully, will permit the bed to be tilted at the desired point, on to blocks 14, which then stop further rotation of the wheels. Obviously, however, if there is no friction or other inhibitions, the wheels continue to rotate during rearward movement of the tow vehicle, the contents of the trailer may never be dumped, or if dumped, dumped in the wrong place.

The present invention, as will be quickly appreciated, combines the best features of the prior art in a unique and simple manner to achieve the objectives of the inventions, which are:

SUMMARY OF THE INVENTION

The present invention contemplates the construction of a tiltable utility trailer in which a bed, including a frame, is secured above a wheeled axle and tiltable about the axle when the bed is unlatched from the tongue or hitch of the trailer and the rear wheels are stopped from further rearward movement, and rotatable about a pivot point of the rear of the frame. The wheels of the trailer actually leave the ground as the bed and frame rotate about a rear frame rail to provide unparalleled ease of access to the trailer bed from ground level.

With the foregoing in mind, it is a principal objective of the present invention to provide a tiltable utility trailer that is essentially operable from a single position forward of the trailer bed, thereby maximizing safety of use and simplicity of operation. Another objective of the present invention is to provide a utility trailer wherein once the bed and frame are released from the tongue, the wheels are fully secured against any inadvertent rearward movement, thereby further enhancing safety and performance of the tilt feature of the invention.

A further objective of the present invention is to provide such a trailer in which the bed of the trailer actually contacts the ground, providing additional security against rearward movement even with the wheels elevated and, further, making the loading and unloading of the contents of the trailer, whether or not otherwise powered, without recourse to ramps and other artificial means for removing and loading the contents without damage thereto or danger to the operator.

A still further objective is to create a tiltable utility trailer which is capable of being moved by a variety of powered vehicles from trucks to ATVs without compromise to safety and benefits of use.

The foregoing, as well as other objectives and advantages, will become apparent from a reading of the detailed description of the invention, taken in concert with the drawings, wherein:

IN THE DRAWINGS

FIG. 1 is a side elevation of a utility trailer constructed in accordance with the present invention, as it would appear in its transport position on the ground and tethered to a tow vehicle, e.g., a truck;

FIG. 2 is a rear end view of the trailer of FIG. 1, illustrating certain features thereof;

FIG. 3 is a figure similar in view to that of FIG. 2, except that the anchor bar has been deployed, as is the case in FIG. 3;

FIG. 4 is a side elevation, similar to that of FIG. 1, except the anchor bar, which anchors the chains to the ground preparatory to assumption of the dumping mode, has been deployed;

FIG. 5 is a side elevation of the utility trailer of the present invention wherein the frame has been disengaged from the tongue, the anchor bar is in place, and the tipping motion has been initiated by the rearward movement of the tow vehicle;

FIG. 6 is a perspective view of the underside of the bed and frame, with the tongue assembly partially cut away so as to illustrate the interaction of the various elements of the invention; and, FIG. 7 illustrates a side elevation of a restraint mechanism shown in the circled area of FIG. 6, and partially sectioned, to illustrate its operation.

DETAILED DESCRIPTION OF A PREFERRED EMBODIMENT

With reference now to the drawings, and initially to FIGS. 1 and 4, a utility trailer 15 is illustrated in profile. The trailer 15 comprises a box, or bed, 17 rigidly affixed to a frame 19 to define, in cooperation, a bed/frame assembly. The frame, best viewed in FIG. 6, is of a relatively standard construction, with longitudinally extending rails 21 and cross braces 22, constructed of any suitable material, e.g., angle iron, welded into a matrix for support of the trailer bed 17, which is attached in any well known manner. Upstanding members 23, affixed to the frame, form a box which defines the perimeter of the bed 17.

The bed may be constructed of wood and may have side boards 24 and a tail gate 26, which is hinged at 28, at its base to the frame so as to drop for convenience in loading and unloading the cargo.

The bed 17 and frame 19 are mounted, as a unit, for transportation on an axle 31, supported by a pair of wheels 33. The axle is mounted relative to the frame, rearwardly of the center of gravity thereof, by means of leaf spring assemblies 34, and trunnions 35 secure the axle to the spring in order to permit the bed and frame to be rotated relative to the axle in a plane that is transverse thereto.

The trailer 15 is intended to be moved from place to place by a tow vehicle, a portion of which is represented in the figures by the letter V. This is accomplished, in keeping with the invention, by the use of a tongue assembly 36, which is attached to the bed and frame unit, projecting forwardly, and terminating in a hitch 37 affixed at the remote end thereof. The tongue, assembly in this illustrated case, comprises an elongated triangular tow bar assembly 39, having a conventional ball and socket type hitch mechanism 40, the socket of which selectively encircles and clamps to a ball secured to the vehicle V.

The bar 39 preferably attaches at the perimeter of the frame and is provided, at the face of the trailer, with a "U" shaped bracket 41, having outwardly extending arms 42 which embrace the trailer frame and bed.

As best seen in FIG. 1, the arms terminate in an aperture 44, which receives a pin 46 which is affixed to the bed of the trailer toward the top of the upper edge of the side wall on either side thereof, thereby permitting limited rotation of the bed and frame relative to the hitch 37 about the pins 46.

It is an important feature of the present invention that the wheels 33 of the trailer 15 be selectively fixed in a predetermined spot relative to the surface "S" over which the trailer is traveling, so as to permit accurate and complete dumping of the contents of the bed, or to alternatively permit the careful unloading of the contents, whichever is deemed appropriate.

It will be noted that the art is replete with chock type devices for positioning the wheels of a vehicle against inadvertent movement. However, such devices pose the prospect of the wheels simply rolling over the stop, or chock, in response to excess force, or some other outside influence. The objective of the present invention addressed here is to provide a positive stopping device that avoids the deficiencies of its predecessors.

To this end, the trailer of the present invention is provided with an anchor 50, which may take the form of a length of angle iron oriented in a plane transverse to the direction of movement of the trailer. It will be appreciated that other suitable anchor devices may be employed without departure from the invention. The anchor is affixed to the frame of the trailer by means of flexible ties, such as chains 53. The chains are attached to the anchor in a well known manner, the important factor being that they are spaced by a distance "d" equal to the track of the trailer, i.e., the distance between the center of the wheels, as seen in FIG. 2. The ends of the chains 53 remote from the anchor are affixed, in any suitable fashion, to the frame 19 and, as is the case with respect the anchor, the chains are affixed at a distance equal to the track of the trailer 15.

Having provided the configuration as described above, it will be appreciated that by deploying or dropping anchor 50 from its stowed position adjacent the frame of the trailer, as seen in FIG. 2, to a predetermined spot behind the wheels, the position of the chains relative to the surface upon which the trailer is movably supported is likewise fixed. Therefore, by backing the trailer 15 toward the anchor, the wheels of the trailer engage the chains, pin them to the surface S, and as seen in FIG. 4, cause the trailer bed to begin to rotate counterclockwise as seen in that Figure. Thus, the weight of the trailer itself is utilized to affix the position thereof for dumping.

By virtue of the low slung structure of the trailer, the rear most cross brace 22 will quickly move toward engagement with the surface S. In order that contact with the earth, or the surface S will be positive and, coincidently, will not damage the trailer frame, the frame is provided, in accordance with this aspect of the invention, a fulcrum 55, in the nature of an angle iron as shown, although other configurations would serve the purpose. The fulcrum 55 quickly makes contact with the surface S as the trailer is rotated, and once having done so, serves as the point or fulcrum about which the trailer may be more fully rotated as it continues to be moved rearwardly. The result achieved will now be readily understood in that with the tail gate 26 lowered, the contents of the trailer bed will be deposited in the desired position on the surface S. It will be further appreciated that if the contents of the trailer is rolling stock, e.g., an ATV, riding mower, or other such devices, rotation of the trailer to the point of contact between the fulcrum and the surface S, will permit a smooth transition of such rolling stock from the bed of the trailer to the surface S. Indeed, it is a feature of this trailer that once contact with the surface is made, the trailer is anchored and may be rotated by rearward force on the tongue assembly to a virtually infinite number of angles to accomplish a variety of tasks.

It is important that the tilting, or rotation, of the trailer bed be deliberate. To this end, a latch mechanism 60 is provided to hold the trailer bed in position relative to the tongue assembly until such time as the user wishes to cause rotation, or tilting thereof. Specifically, a rod 62 is slideably mounted to the tongue by means of a bracket 64, which includes a spring 66 intended to bias the rod 62 toward its locked position in which the end of the rod fits into an aperture in the frame 19 to hold the position of the trailer bed and frame against the tongue assembly 36.

The end of the rod 62 remote from the locking end has an upturned portion 68 and is located in proximity with the hitch in order that the user can activate the tilt capability of the trailer 15 from that position by simply tugging on the upturned end 68 to move the rod against the bias of the spring to release the latch, thereby freeing the trailer and bed assembly to rotate.

Quite clearly, the anchor 50 can not simply be left to drag on the ground, and to obviate that complication, nor can the chains be left to catch on material in the path of the trailer, apparatus is provided which is capable of moving the anchor, and the chains between its deployed position, illustrated, e.g., in FIGS. 3, 4, 5, and 6, and its stowed position, as in FIGS. 1 and 2.

Thus, in accordance with this aspect of the invention, apparatus for deploying and stowing the anchor is provided, which includes a winch 71 is which mounted on the tongue assembly 36 by a bracket 73 just rearward of the hitch at the free end thereof. The winch assembly comprises a reel 75 mounted for rotation in the bracket 73, and a crank 77 is attached to the axis of the reel for manual rotation thereof.

A tie, such as, for example, a belt, 79 is wound onto the reel 75 and extends through a retainer 82 on the tongue beneath the bed and frame assembly. Another positioning retainer 84 is affixed to the frame rearwardly of the axle 31, through which the belt 79 is threaded on its way to attachment, at the approximate center of the anchor 50. As the reel is rotated, the belt 79 will raise or lower the anchor at the instance of the user.

Similarly, in order to preclude the chains 53 from dragging on the ground, or otherwise inhibiting the use of the trailer 15, secondary or stub belts 86 and 87 are secured to the belt 79 and move through the retainer 84. The other ends of the stub belts are attached to the chains such that when the anchor is winched to its stowed position, the chains are simultaneously retracted beneath the bed and frame assembly and well out of harms way.

On those occasions when the load in the trailer/frame assembly is inordinately heavy, or is liquid, or is otherwise susceptible to side loading, there is a tendency for the trailer bed to attempt to shift laterally. In order, in accordance with the invention, to minimize this undesirable transverse movement, a stop is provided. To this end, the tongue assembly is provided with a boss 90 formed, or otherwise attached thereto, and having at least one, and preferably at least a pair, of recesses 92 defined therein. In vertical alignment with the recesses is at least one protuberance 94 in the form of a pin, which may also take the form of the head of a bolt projecting downwardly, as seen if FIG. 7, from the frame 19. When the bed is at rest on the tongue, the pin, or pins, 94 are housed in the recess, or recesses, 92 and side thrust is obviated.

Having thus described a preferred embodiment of the present invention it will be appreciated that the operation and function of the trailer is readily accomplished by the operator while seated in the vehicle used to tow it. The position of the winch and latch are in immediate proximity to the hitch, and readily manually manipulatable. Once unlatched, the trailer is backed onto the anchor and from that position the wheels ride up the chains, causing the trailer to revolve the fulcrum into the ground. Further rearward movement will, of course dump the contents of the load carrying assembly.

By way of accessory, a pad may be provided, preferably anchored at the rear of the bed to protect the bed's surface and facilitate dumping of the load.

Having thus described a preferred embodiment of the present invention, what is claimed is:

1. A utility trailer of a type which is transportable over a surface such as the earth, comprising, in combination:

a frame; at least one axle, said frame being mounted on each said at least one axle for limited rotation thereabout;

a pair of wheels, said wheels being rotatably attached to and supporting said at least one axle;

a bed, said bed being secured to said frame to define a load carrying assembly, said assembly being mounted on and being rotatable relative to each said at least one axle;

an anchor connected to said frame, said anchor being deployable between a stowed position, and an anchor position wherein said anchor is disposed on the surface, said anchor being sized and shaped to permit said wheels to roll over it when said anchor is in said anchor position, at least one chain, each said at least one chain interconnecting said anchor and said frame, each said at least one chain being coplaner with one of said wheels, and so positioned relative to said wheel and of a length sufficient to allow said at least one chain to be engaged by said coplaner wheel after said anchor is deployed to said anchor position and said coplaner wheel first rolls over said anchor, and then said coplaner wheel engages said coplaner chain to inhibit further movement of said wheel when said trailer is moved backwardly over said anchor;

and a fulcrum, said fulcrum being connected to said load carrying assembly, and being urged into engagement with the surface when each said coplaner wheel is moved against said at least one chain, such that further movement of said trailer results in the bed being tilted about said fulcrum to dump the contents of said bed.

2. The utility trailer of claim 1, wherein said anchor is located adjacent said load carrying assembly in said stowed position.

3. The utility trailer of claim 1, wherein a pair of chains is provided, each said chain being coplaner with a wheel when said anchor is deployed.

4. The utility trailer of claim 1, wherein a tie is provided, said tie being connected to said anchor for manually raising and lowering said anchor.

5. The utility trailer of claim 1, wherein said trailer includes a tongue assembly, said tongue assembly having a free end, said free end having a hitch mechanism thereon a winch disposed on said tongue assembly and connected with said load carrying assembly, and said hitch being attached to said load carrying assembly such that said load carrying assembly is rotatable relative thereof.

6. The utility trailer of claim 1, wherein said fulcrum is disposed at the rear most location on said frame.

7. The utility trailer of claim 4, wherein said tie comprises a belt, said belt being threaded beneath said load carrying assembly; a winch, said winch being disposed on a tongue assembly, said belt being selectively windable on said winch to raise and lower said belt.

8. The utility trailer of claim 1, wherein stub ties are provided, said stub ties being attached to said tie and each said at least one chain such that each said at least one chain is held in position adjacent said load carrying assembly when said anchor is in said stowed position.

9. The utility trailer of claim 5, wherein a latch is provided, said latch adapted to prevent rotation of said load carrying assembly relative to said tongue assembly, and being selectively unlatched to permit such rotation.

10. The utility trailer of claim 5, wherein stop means is provided between said tongue assembly and said load carrying assembly to inhibit lateral movement of said load carrying assembly relative to said tongue assembly.

11. The utility trailer of claim 9, wherein said winch and said latch are disposed on said tongue assembly in proximity to said hitch so as to be reachable by an operator at that location.

12. The utility trailer of claim 10, wherein said stop means comprises at least one pin, a recess in alignment with said pin, said pin reposing in said recess when said load carrying assembly is at rest on said tongue assembly.

13. A utility trailer of a type which is transportable over a surface such as the earth, comprising, in combination:

a frame; at least one axle, said frame being mounted on each said at least one axle for limited rotation thereabout;

a pair of wheels, said wheels being rotatably attached to and supporting each said at least one axle;

a bed, said bed being secured to said frame to define a load carrying assembly, said load carrying assembly being mounted on and being rotatable relative to each said at least one axle;

a tongue assembly for attachment to a tow vehicle, said tongue assembly having a free end, said free end having a hitch mechanism thereon, and said hitch being attached to said load carrying assembly such that said load carrying assembly is rotatable relative thereto;

an anchor connected to said frame, said anchor being deployable between a stowed position wherein the anchor is positioned beneath said load carrying assembly, and an anchor position wherein said anchor is disposed on the surface, said anchor being sized and shaped to permit said wheels to roll over it when said anchor is in said anchor position, at least one chain, each said at least one chain interconnecting said anchor and said frame, each said at least one chain being coplaner with one of said wheels, and so positioned relative to said coplaner wheel and of a length sufficient to allow said at least one chain to be engaged by said coplaner wheel after said anchor is deployed to said anchor position and said coplaner wheel first rolls over said anchor and engages said coplaner chain to inhibit further movement of said wheel when said trailer is moved backwardly over said anchor;

a fulcrum, said fulcrum being connected to said load carrying assembly, and being urged into engagement with the surface when each said coplaner wheel is moved against said each chain, such that further movement of said trailer results in the bed being tilted about said fulcrum to dump the contents of said bed.

14. The utility trailer of claim 13, wherein said anchor is located adjacent said load carrying assembly in said stowed position.

15. The utility trailer of claim 13, wherein a pair of chains is provided, each said chain being coplaner with a wheel when said anchor is deployed.

16. The utility trailer of claim 13, wherein said trailer includes a tongue assembly, said tongue assembly having a free end, said free end having a hitch mechanism thereon, and said hitch being attached to said load carrying assembly such that said load carrying assembly is rotatable relative thereto.

17. The utility trailer of claim 13, wherein said tie comprises a belt, said belt being threaded beneath said load carrying assembly; a winch, said winch being disposed on a tongue assembly; said belt being selectively windable on said winch to raise and lower said belt.

18. The utility trailer of claim 13, wherein stub ties are provided, said stub ties being attached to said tie and each said at least one chain such that each said at least one chain is held in position adjacent said load carrying assembly when said anchor is in said stowed position.

19. The utility trailer of claim 13, wherein stop means is provided between said tongue assembly and said load carrying assembly to inhibit lateral movement of said load carrying assembly relative to said tongue assembly.

* * * * *